(12) United States Patent
Chalvet

(10) Patent No.: US 12,247,608 B2
(45) Date of Patent: Mar. 11, 2025

(54) CONNECTING ELEMENT, FIRST COMPONENT WITH THE CONNECTING ELEMENT, CONNECTION STRUCTURE USING THE CONNECTING ELEMENT, PRODUCTION METHOD FOR THE CONNECTING ELEMENT AND RESPECTIVE CONNECTING METHOD

(71) Applicant: Bollhoff Otalu S.A., La Ravoire (FR)

(72) Inventor: Franck Chalvet, Saint Baldoph (FR)

(73) Assignee: Bollhoff Otalu S.A., La Ravoire (FR)

( * ) Notice: Subject to any disclaimer, the term of this patent is extended or adjusted under 35 U.S.C. 154(b) by 179 days.

(21) Appl. No.: 17/978,349

(22) Filed: Nov. 1, 2022

(65) Prior Publication Data

US 2024/0141947 A1    May 2, 2024

(30) Foreign Application Priority Data

Nov. 3, 2021 (EP) ..................................... 21306544

(51) Int. Cl.
*F16B 13/06* (2006.01)
*F16B 37/12* (2006.01)

(52) U.S. Cl.
CPC ................................. *F16B 37/122* (2013.01)

(58) Field of Classification Search
CPC ................................................... F16B 37/122
USPC ......................................................... 411/105
See application file for complete search history.

(56) References Cited

U.S. PATENT DOCUMENTS

| | | | |
|---|---|---|---|
| 3,534,797 A | 10/1970 | Reinhard et al. | |
| 3,694,013 A | 9/1972 | Heitner | |
| 4,749,318 A * | 6/1988 | Bredal | F16B 37/122 411/180 |
| 5,066,180 A * | 11/1991 | Lang | F16B 37/044 411/113 |
| 5,632,582 A * | 5/1997 | Gauron | F16B 5/01 411/258 |

(Continued)

FOREIGN PATENT DOCUMENTS

| | | |
|---|---|---|
| CN | 105952759 A | 9/2016 |
| DE | 3304569 C1 | 7/1984 |

(Continued)

OTHER PUBLICATIONS

CN Office Action for CN Application No. 202211373406.5 dated Jan. 17, 2025 (10 pages).

*Primary Examiner* — Gary W Estremsky
(74) *Attorney, Agent, or Firm* — Reising Ethington P.C.

(57) ABSTRACT

A generally T-shaped connecting element adapted to connect a first component to a second component with lateral tolerance compensation, which are arranged in a distance with respect to each other, comprises a hollow shaft having a through-hole, a laterally, which may be radially, outwardly extending collar at a first axial end of the hollow shaft and an inner thread in the hollow shaft for engagement with a connecting screw, a plurality of flexible webs extending laterally, which may be radially, outwardly from the hollow shaft, and being flexible in the lateral, which may be radial, direction, and a tolerance gap for receiving an intermediate support of the first component is formed between a bottom side of the collar facing the flexible webs and the sides of the flexible webs facing the collar.

11 Claims, 12 Drawing Sheets

(56) References Cited

U.S. PATENT DOCUMENTS

| | | | |
|---|---|---|---|
| 7,484,700 B2* | 2/2009 | Selle | A47B 91/024 |
| | | | 248/346.11 |
| 7,614,602 B2* | 11/2009 | Hutter, III | H02G 3/30 |
| | | | 411/533 |
| 8,764,361 B2* | 7/2014 | Seaman | F16B 31/02 |
| | | | 411/125 |
| 9,995,331 B2 | 6/2018 | Heimann et al. | |
| 10,260,546 B2 | 4/2019 | Goldberg et al. | |
| 10,376,129 B2* | 8/2019 | Kangas | A47L 15/4285 |
| 10,533,589 B2 | 1/2020 | Tatarinov | |
| 2010/0260574 A1* | 10/2010 | Schendel | F16B 5/025 |
| | | | 411/105 |
| 2017/0370394 A1 | 12/2017 | Foenander et al. | |
| 2018/0010625 A1 | 1/2018 | Goldberg et al. | |
| 2018/0038399 A1* | 2/2018 | Fischer | F16B 37/042 |
| 2018/0125324 A1 | 5/2018 | Kangas et al. | |
| 2020/0355207 A1 | 11/2020 | Radanovic et al. | |
| 2021/0039720 A1 | 2/2021 | Mosch | |

FOREIGN PATENT DOCUMENTS

| | | |
|---|---|---|
| DE | 19538378 A1 | 4/1997 |
| DE | 102018102291 A1 | 8/2019 |
| DE | 102016118138 B4 | 4/2020 |
| DE | 102019206750 A1 | 11/2020 |
| DE | 102019211757 A1 | 2/2021 |
| EP | 2667041 A1 | 11/2013 |
| EP | 3839272 A1 | 6/2021 |
| FR | 2754573 A1 | 4/1998 |
| GB | 459349 A | 1/1937 |

* cited by examiner

CONNECTING ELEMENT, FIRST COMPONENT WITH THE CONNECTING ELEMENT, CONNECTION STRUCTURE USING THE CONNECTING ELEMENT, PRODUCTION METHOD FOR THE CONNECTING ELEMENT AND RESPECTIVE CONNECTING METHOD

CROSS REFERENCE TO RELATED APPLICATIONS

This application claims the priority to EP Patent Application No. EP21306544.4 filed on Nov. 3, 2021, and the entire content of this priority application is incorporated herein by reference in its entirety.

TECHNICAL FIELD

The present disclosure is related to a generally T-shaped connecting element adapted to connect a first component to a second component with lateral tolerance compensation, which are arranged in a distance with respect to each other, a first component having a through-hole in which the connecting element is arranged, a connection structure consisting of the first component, a second component and a connecting screw, a production method for the connecting element and a connecting method using the connecting element.

BACKGROUND

In the state of the art, connecting elements for establishing a connection between a first and a second component, which are arranged with a distance therebetween, are generally known, in particular in the field of the automotive industry.

For example, DE 195 38 378 A1 describes a device for connecting spaced components. The device is used to connect separated components which each have mounting openings, using a connecting screw and an associated counter bearing. A rotationally secure guide element for the connecting screw is associated with the first component, and the counter bearing is produced by profiling on the cylindrical surface of the mounting opening on the second component. The profiling is formed by the screwing action and follows the thread line. The guide component has a position which is fixed relative to the first component and has an internal thread.

A tolerance-compensating element for compensating for a distance between a dashboard support and a body component of a vehicle, such as an A pillar or an end wall, wherein the dashboard support is connectable to the body component by means of a fastening screw, is described in DE 10 2016 118 138 B4. The tolerance-compensating element comprises a frame structure with a first fastening portion and a second fastening portion, wherein the first fastening portion and the second fastening portion are arranged opposite each other and are connected by lateral webs. The first fastening portion and the second fastening portion are spaced apart from each other, and a first aperture is formed in the first fastening portion. The second fastening portion is configured for fastening the tolerance-compensating element to the dashboard support. Further, a threaded nut is present that is assigned to the first fastening portion and is provided for receiving the fastening screw.

A device for compensating for tolerances between two parts, in particular vehicle parts, that are to be connected by means of a connecting screw, with a holding device for arranging on a first part, and a compensation device that may be brought into contact with a second part and is situated so as to be movable relative to the holding device is also described in DE 10 2018 102 291 A1. Here, the compensation device has an inner engagement structure for form-fit engagement with threads of the connecting screw.

A disadvantage of the above discussed elements is that they focus on the connecting of two components at each other, at most in combination with an axial tolerance compensation. A lateral or radial tolerance compensation is not discussed in these documents.

US 2017/0370394 A1 describes methods and an apparatus for retaining a fastener receiver. The apparatus includes a retainer to retain a nut assembly adjacent an object. The retainer includes a first plate defining a first opening. The first plate is to couple to the object. The first opening is to receive a portion of the nut assembly when the retainer is coupled to the object. The retainer includes a second plate defining a second opening and including a first deflectable tab adjacent the second opening. The second plate is to couple to the first plate opposite the object. The deflectable tab of the second plate is to cover a portion of the first opening of the first plate. The first deflectable tab is to deflect to receive and retain the portion of the nut assembly in the first opening when the retainer is coupled to the object.

A device for compensating of tolerances between a first component and a second component is further described in DE 10 2019 206 750 A1. The device has an elastic centering arrangement which is provided and in particular formed for centering the device in a nominal position on the first component.

Finally, DE 10 2019 211 757 A1 describes a radial compensation element for compensating tolerances between a first component and a second component, which is connected to the first component by means of a connecting bolt. The compensation element comprises a main body having a receiving channel in which the connecting bolt can be received, wherein the receiving channel is configured to receive the connecting bolt. Further, the compensation element comprises a plurality of elastic elements, configured to radially compensate for tolerances between the connecting bolt and the first component. The receiving channel centrally presses the connecting bolt in a state of having been inserted into the receiving channel in a nominal position.

A disadvantage of these solutions is the number of parts and the corresponding high production costs as well as the effort when establishing the connection.

It is therefore an object of at least some implementations of the present disclosure to provide a simplified connecting element adapted to connect a first component to a second component with lateral tolerance compensation, which are arranged in a distance with respect to each other. Further, it is also an object of at least some implementations of the present disclosure to provide a respective first component, a connection structure, a production method for the connecting element and a connecting method using the connecting element.

SUMMARY

The above object is solved by a generally T-shaped connecting element, a first component, a connection structure, a production method for a connecting element and a connecting method are disclosed. Further embodiments and developments result from the following description, the drawings as well as the appending claims.

A generally T-shaped connecting element adapted to connect a first component to a second component with lateral, which may be radial, tolerance compensation, which are arranged in a distance with respect to each other, comprises a hollow shaft having a through-hole, a laterally, which may be radially, outwardly extending collar at a first axial end of the hollow shaft and an inner thread in the hollow shaft, which may be adjacent to the first axial end of the hollow shaft, for engagement with a connecting screw, a plurality of flexible webs extending laterally, which may be radially, outwardly from the hollow shaft, and being flexible in the lateral, which may be radial, direction, and a tolerance gap for receiving an intermediate support of the first component is formed between a bottom side of the collar facing the flexible webs and the sides of the flexible webs facing the collar.

In the following, the construction of the generally T-shaped connecting element is explained for an easier understanding based on its use. The generally T-shape of the connecting element results from the hollow, which may be cylindrical, shaft in combination with the collar. In this regard, it is assumed that the first and second components shall be arranged in a distance to each other as it is known for example in the automotive industry, e.g. when mounting lights to a vehicle frame or a cladding to a door frame.

Starting point is the first component which may have a threadless, through-hole. In this through-hole of the first component, a laterally or radially inwardly extending intermediate support is present, which may be formed adjacent to a top side of the first component and has a first height, i.e. extension in the axial direction of the hollow shaft. In this regard, the term laterally mainly refers to structures having a non-round cross-section whereas the term radially refers mainly to structures being round or circular in cross-section.

Referring again to the intermediate support and assuming a circular or round cross-section, the intermediate support, thus, provides a portion with reduced diameter compared to the diameter of the remaining of the through-hole of the first component. The intermediate support may extend circumferentially all round or it may have breakthroughs or may be interrupted.

In this through-hole of the first component, the connecting element is inserted from the top side of the first component. When proceeding in this way, a second axial end of the hollow shaft is inserted first, i.e. the axial end opposite to the collar. During the insertion of the connecting element into the through-hole of the first component, the flexible webs are compressed laterally or radially inwards by the intermediate support and, as soon they have passed this intermediate support, they flex radially to the outside.

As a first result, the flexible webs allow a clipping of the connecting element into the through-hole of the first component. Further, the intermediate support of the first component is arranged in the tolerance gap between the bottom side of the collar facing the flexible webs and the sides of the flexible webs facing the collar. The tolerance gap and the thickness of the intermediate support are adapted to each other such that an axial movability of the generally T-shaped connecting element in this state is given. The axial movability may be chosen such that it corresponds to one thread pitch of the inner thread provided in the hollow shaft. By means of this, a thread offset compensation can take place in case an inner thread provided at the second component and the inner thread in the hollow shaft are offset.

As a second result, and as the flexible wings have flexed radially to the outside, they may abut at the inner wall of the through-hole of the first component. Accordingly, the flexible webs provide a centering function of the connecting element in the through-hole of the first component.

Now, a connecting screw is inserted into the through-hole of the first component from a bottom side of the first component, which is opposite to the top side of the first component. Consequently, the insertion or screw-in direction of the connecting screw into the first component and the connecting element is opposite to the insertion direction of the connecting element into the through-hole of the first component. This connecting screw is then screwed into the inner thread provided by the hollow shaft of the connecting element. In this regard, it is pointed out that a rotation protection may be formed between the collar and the first component, which may be by a shape of the collar as will be explained later in detail. Further, and depending on the desired application, a transportation security may be provided by a seal coating on the connecting screw or by a specific shape of the last thread of the inner thread in the hollow shaft in case the hollow shaft is made of plastic material.

At the same time, before or after the screwing in of the connecting screw into the first component, a second component having an opening is arranged in alignment with the first component, such that a distance may be present between the first and the second component. The arrangement of the first and the second component is such that the top side of the collar, which is opposite to the bottom side of the collar, and the top side of the first component face the second component.

In a first example and for an easier understanding, it is assumed that the longitudinal central axis defined by the hollow shaft of the connecting element in its central position in the through-hole of the first component extends centrally through the opening in the second component. Thus, no compensation of radial tolerances is required.

When the connecting screw is now further screwed into the inner thread in the hollow shaft, it comes into engagement with an inner thread provided at or adjacent to the opening of the second component. In this example, as mentioned above, the connecting element is in its centered position in the through-hole of the first component.

In all above states, the axial movability of the connecting element due to the tolerance gap is present.

This changes after the head of the connecting screw comes into abutment with the bottom side of the first component. If the connecting screw is screwed in further in this state, a relative movement between connecting element and connecting screw is maintained by the connecting element moving in the direction of the head of the connecting screw. This can be performed until the bottom side of the collar abuts the intermediate support and a further screwing in is blocked.

As a result, the two components are fastened at each other with a distance there between by means of the connecting element.

In a second example, it is assumed that the longitudinal central axis defined by the hollow shaft of the connecting element in its central position in the through-hole of the first component and, thus, the central longitudinal axis of the through-hole of the first component does not extend centrally through the opening in the second component. Thus, a compensation of radial tolerances is required. In such case, the connecting element is moved in the through-hole of the first component laterally or radially for bringing the central longitudinal axis of the hollow shaft in alignment with the central longitudinal axis of the opening in the second component. The lateral or radial movability of the connecting element in the through-hole of the first component is limited by the inner dimensions or diameter of the intermediate support in relation to the outer dimensions or diameter of the connecting element in the portion of the tolerance gap and/or by the inner dimensions or diameter of the through-hole of the first component in relation to the outer dimensions or diameter of the connecting element in the region of the flexible webs in case of laterally compressed flexible webs.

A first advantage of the connecting element is that it can be easily fastened in the first component by clipping, is self-centering and realizes a lateral or radial tolerance compensation. A further advantage is that the connecting element allows that a connection between two components which are arranged in a distance with respect to each other can be established with a device having a reduced part number compared to the prior art. From these advantages, the further advantage results that the connecting element has a lower production effort, is space saving and weight reduced, which results also in economic advantages.

According to a further embodiment, the collar of the connecting element has a shape providing a rotation protection, the collar may have a non-round shape and/or at least one laterally, which may be radially, outwardly extending projection for providing the rotation protection. As mentioned above, a co-rotation of the connecting element should be prevented when screwing the connecting screw into the connecting element. This can be realized with the above-mentioned shapes of the collar. These shapes interact for example with a recess formed in the top side of the first component, wherein the recess has a shape complementary to the shape of the collar. In particular, the shape of the collar may be square or polygonal.

In a further embodiment of the connecting element, the sides of the flexible webs facing the collar are arranged in a plane parallel to a plane defined by the bottom side of the collar and/or the sides of the flexible webs facing away from the collar are chamfered, which may be in the axial and/or radial direction of the hollow shaft. The first alternative provides that the tolerance gap is defined by two parallel planes. In combination with an intermediate support of the first component, an even abutment and, thus, a good interaction between connecting element and first component, can be achieved. By means of the second alternative, the inserting of the connecting element into the through-hole of the first component is facilitated in that the force for inserting the connecting element is reduced compared to non-chamfered flexible webs. Further, by means of the chamfering the risk of scratches during the inserting of the connecting element into the first component is reduced.

Advantageously, the flexible webs are formed by laterally, which may be radially, outwardly extending spring arms, a first end of which is fastened at the connecting element and a second end of which is a free end. The spring arms may be an embodiment of the flexible webs, although many other designs can be chosen which provide a lateral or radial flexibility. Nevertheless, the usage of spring arms fixed with one end at the connecting element and having an opposed free end has been proven specifically advantageous. Beginning at the fixed end, the spring arms may extend radially outwardly in clockwise or counterclockwise direction. In each case, the free end has the largest distance to the hollow shaft of the connecting element. In this regard, all spring arms may extend in the same direction, i.e. clockwise or counterclockwise direction.

In a first alternative, the connecting element may be a two-part element, a first part of which consists of the shaft comprising the collar and a second part of which consists of a hollow element at which the laterally, which may be radially, outwardly extending flexible webs are provided. In this alternative, the first part and the second part may be connected to each other in a rotation proof manner, in particular by at least one of a press fit, adhesion, shrinking, or are made by a two-component plastic injection molding method. By means of these embodiments, the first part can be made of metal so that a metal-to-metal connection between the inner thread in the hollow shaft and the connecting screw can be established. Alternatively, two different plastics may be used for manufacturing the connecting element so that the first part can be designed based on the desired or required stability whereas the second part can be designed based on the desired or required flexibility for the lateral tolerance compensation. In a further embodiment, the inner thread in the hollow shaft may be reinforced by means of a wire thread insert. This may be useful in case of a first part made of plastic or aluminum.

In a second alternative, the connecting element is a one-part element, which may be made of plastic material. This alternative provides a further reduced part number, as only a single part is present. Accordingly, a further weight reduction can be achieved. Depending on the field of application, the inner thread in the hollow shaft by means of a wire thread insert may be reinforced.

A first component has a through-hole in which a connecting element may be arranged, wherein an intermediate support of the first component extends laterally, which may be radially, inwardly in the through-hole of the first component and the intermediate support is arranged in the tolerance gap of the connecting element such that an axial movability of the generally T-shaped connecting element is limited by the collar and the flexible webs, a rotation protection is formed between the collar and the first component, which may be by a shape of the collar, and the flexible webs are arranged within the through-hole of the first component thereby realizing a tolerance compensation in the lateral, which may be radial, direction. With this first component, the technical effects and advantages as mentioned above in combination with the connecting element can be realized. Accordingly, and for avoiding repetitions, it is referred to the above explanations.

In a further embodiment of the first component, the first component further has a recess adjacent to the intermediate support in which the collar is at least partly arranged and which may have a complementary shape such that the rotation protection is formed by means of the recess and the collar. As mentioned above for the respective embodiment of the connecting element, the shape of the collar may interact with the recess formed in the top side of the first component, wherein the recess has a shape complementary to the shape of the collar. In particular, the shape of the collar may be square or polygonal. By proceeding this way, at least a complete rotation, i.e. a rotation by 360°, of the connecting element in the through-hole of the first component is prevented. The recess formed in the top side of the first component is such that in case the sides of the flexible webs facing the collar abut at the intermediate support the top side of the collar may be arranged flush with the top side of the first component adjacent to the recess.

Furthermore, a diameter of the through-hole of the first component may be smaller than an outer diameter of the flexible webs of the connecting element. This dimensioning may ensure the centering function of the connecting element in the through-hole of the first component as the flexible webs can abut at the inner wall of the through-hole of the first component.

A connection structure consists of the first component, a second component and a connecting screw, wherein the connecting screw extends through the first component and is engaged with the inner thread in the hollow shaft of the connecting element as well as with an inner thread at the second component, and a head of the connecting screw is supported by the first component. Concerning the details of the connection structure, it is referred to the explanations of the connection element, the use of which has been described in combination with the establishing of a respective connection of two components. Consequently, the above explanations and discussions apply analogously with respect to the technical effects and advantages.

According to a further embodiment of the connection structure, the first and the second component are arranged in a distance to each other. This embodiment may be directed to, for example, applications in the automotive industry in which it is frequently required to fasten two components with a distance therebetween at each other. Examples of this are lights mounted to a vehicle body or frame or claddings mounted to a door frame.

In a further embodiment, the inner thread in the hollow shaft and the inner thread provided at or adjacent to the second component have the same size and thread direction. By means of this embodiment, a screw having a single outer thread can be used for establishing the connection between the two components.

A production method for a connecting element includes the steps of providing a first part, which may be made of metal, comprising the hollow shaft with the collar and the inner thread, providing a second part, which may be made of plastic, consisting of a hollow element having a plurality of laterally, which may be radially, outwardly extending flexible webs, and fastening the second part on the first part by at least one of a press-fit, adhesion, shrinkage or injection molding the second part on the first part, or the connecting element is produced by injection molding the connecting element as a single element by means of an injection mold having the complementary form features. With the production method, the connecting element may be produced. Accordingly, and for avoiding repetitions, it is referred to the above discussion of the connecting element regarding the technical effects and advantages.

A connecting method for connecting a first component to a second component by means of a connecting element comprises the steps of providing a first component having the connecting element inserted therein or providing a first component having a through-hole and inserting the connecting element into the through-hole of the first component such that the first component results, arranging a second component having an opening in alignment with the first component, which may be in a distance to the first component, such that a top side of the collar opposite to the bottom side faces the second component, inserting a connecting screw into the first component and screwing the connecting screw into the first thread provided by the connecting element and, subsequently, into an inner thread provided at or adjacent to the second component until a screw head abuts the first component and a further screwing in is blocked by the collar abutting at the intermediate support, wherein a centering and/or lateral, which may be radial, tolerance compensation is performed by the flexible webs of the connecting element. By means of the connecting method, the connection structure is established. Thus, we refer to the above discussion of the connecting element and the connection structure concerning the technical effects and advantages.

BRIEF DESCRIPTION OF THE DRAWINGS

In the following, the present disclosure will be described in detail based on the drawings. In the drawings, the same reference signs denote the same elements and/or components. It shows.

DETAILED DESCRIPTION

In the following, different embodiments of the connecting element 1 are discussed based on the figures. Nevertheless, and before explaining the use of the connecting element 1, the structure of the generally T-shaped connecting element 1 is explained.

Figure 1:
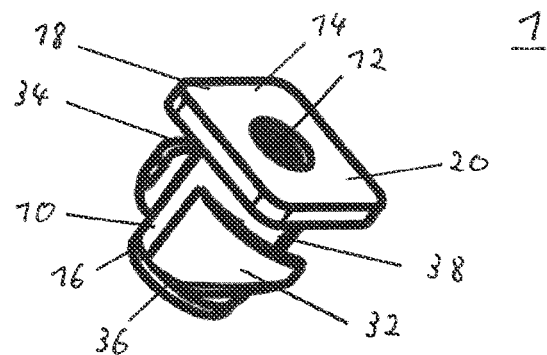
FIG. 1 a perspective view of a first embodiment of the connecting element.
Figure 2:
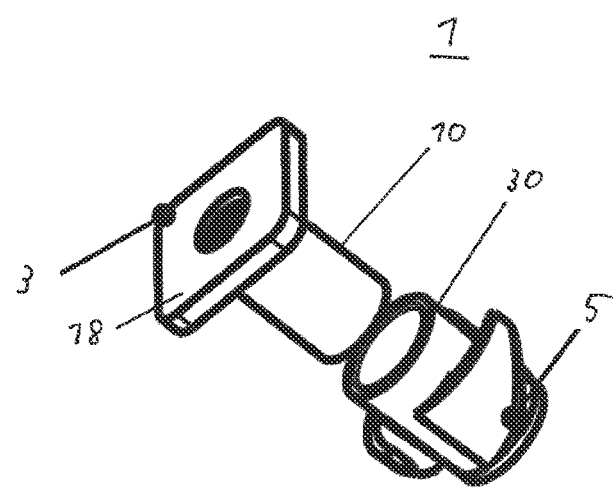
FIG. 2 a perspective exploded view of a second embodiment of the connecting element, FIG. 3 a top view of the second embodiment according to FIG. 2, FIG. 4 a side view of the second embodiment according to FIG. 2, FIG. 5 a bottom view of the second embodiment according to FIG. 2, FIG. 6 a cross-sectional view along the central longitudinal axis through the second embodiment according to FIG. 2, FIG. 7 a perspective view of an embodiment of the connecting element prior to the insertion into a first component, FIG. 8 a perspective view of an embodiment of the connecting element inserted into a first component, FIG. 9 a cross-sectional view along the central longitudinal axis through the first component with inserted connecting element according to FIG. 8, FIG. 10 a perspective view of the first component with inserted connecting element and connecting screw prior to the screwing in of the connecting screw, FIG. 11 a perspective view of the first component with inserted connecting element and screwed in connecting screw, FIG. 12 a cross-sectional view along the central longitudinal axis through the first component with inserted connecting element and screwed in connecting screw according to FIG. 11, FIG. 13 a perspective view of the first component with inserted connecting element and screwed in connecting screw as well as a second component, FIG. 14 a cross-sectional view along the central longitudinal axis through the first component with inserted connecting element and screwed in connecting screw as well as second component according to FIG. 13, FIG. 15 a perspective view of the first component with inserted connecting element and the second component wherein the connecting screw is in its final position, FIG. 16 a side view of the first component with inserted connecting element and the second component wherein the connecting screw is in its final position according to FIG. 15, FIG. 17 a cross-sectional view along the central longitudinal axis through the first component with inserted connecting element and the second component wherein the connecting screw is in its final position according to FIG. 15, FIG. 18 a perspective view of a first component with inserted connecting element which is laterally offset, FIG. 19 a top view of the first component with inserted connecting element which is laterally offset according to FIG. 18, FIG. 20 a bottom view of the first component with inserted connecting element which is laterally offset according to FIG. 18, FIG. 21 a cross-sectional view along the central longitudinal axis through the first component with inserted connecting element which is laterally offset according to FIG. 18, FIG. 22 a cross-sectional view along the central longitudinal axis through the first component with inserted connecting element which is laterally offset according to FIG. 18 and fastened by a connecting screw to a second component, FIG. 23 a schematic course of procedure of an embodiment of a production method for the connecting element, and FIG. 24 a schematic course of procedure of an embodiment of a connecting method.
Figure 3:
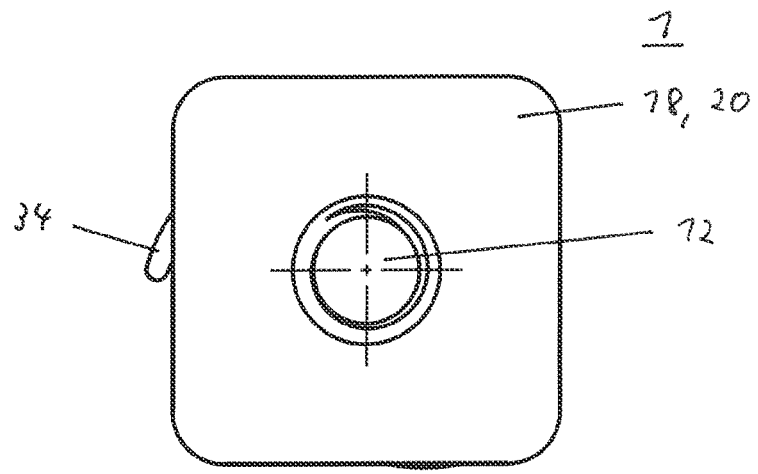
Figure 4:
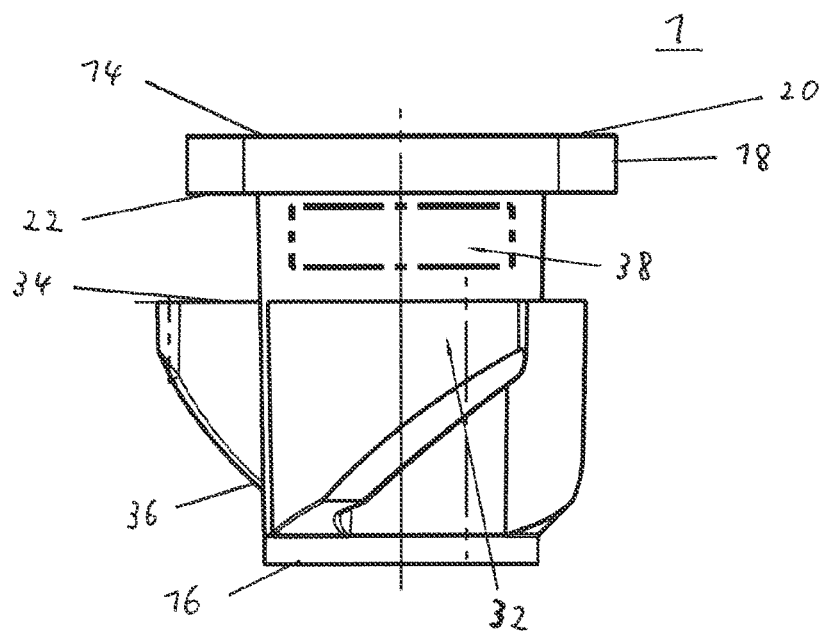
Figure 5:
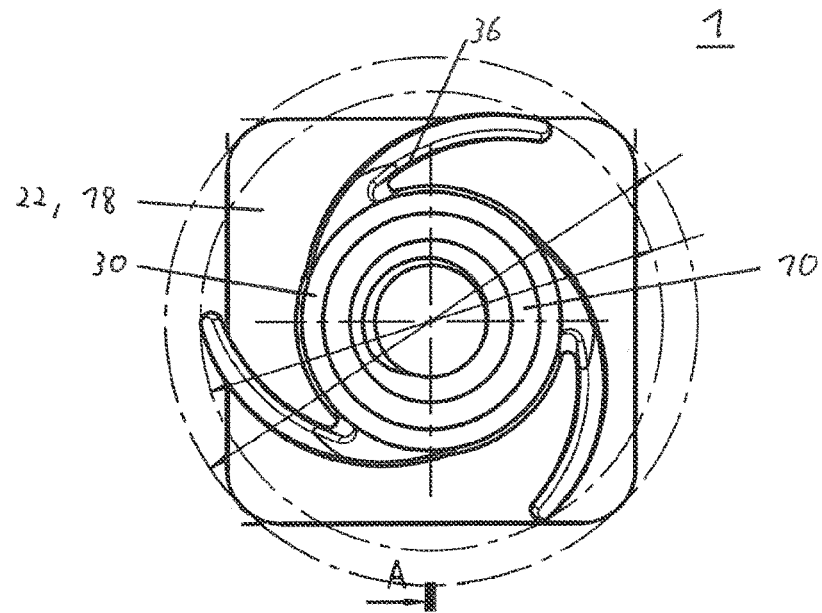

To this end, FIG. 1 shows a perspective view of a first embodiment of the connecting element 1 in which the connecting element 1 is a one-part element, which may be made of plastic material. The other FIGS. 2 to 6 show a second embodiment of the connecting element 1 in which it is a two-part element.

In each case, the connecting element 1 comprises a hollow cylindrical shaft 10 having a through-hole 12 as well as a first axial end 14 and a second axial end 16. At the first axial end 14, a laterally or, in this case and as the hollow shaft 10 has a cylindrical shape, radially outwardly extending collar 18 is present. The collar 18 has a top side 20 and a bottom side 22 opposite to the top side 20. Further, an inner thread 24 is provided in the hollow shaft 10 for engagement with a connecting screw 50.

In the present example, the collar 18 has the shape of a square. Nevertheless, many other shapes are possible as long as they realize in combination with the first component 40 a rotation protection so that a screwing in of the connecting screw 50 into the inner thread 24 in the hollow shaft 10 does not lead to a co-rotation of the connecting element 1. In other words, a rotating of the connecting element 1 in the first component 40 must be less than 360°. Thus, and besides the square shape, any non-round shape and/or a shape having at least one laterally outwardly extending projection for providing the rotation protection may be preferred for the collar 18.

Further, a plurality of flexible webs are present at the connecting element 1, which are in the present case formed by three radially outwardly extending spring arms 32. In the embodiment according to FIG. 1, these spring arms 32 are present directly at the hollow cylindrical shaft 10. In the other embodiment according to FIGS. 2 to 6, a separate hollow element 30 is provided at which the radially outwardly extending spring arms 32 are provided. As the hollow shaft 10 is a cylindrical hollow shaft 10, the hollow element 30 is also a hollow cylindrical element 30. As a result, in this second embodiment the connecting element 1 is comprised of a first part 3 consisting of the hollow shaft 10 and comprising the collar 18 and a second part 5 which consists of the hollow element 30 at which the radially outwardly extending spring arms 32 are provided.

Figure 6:
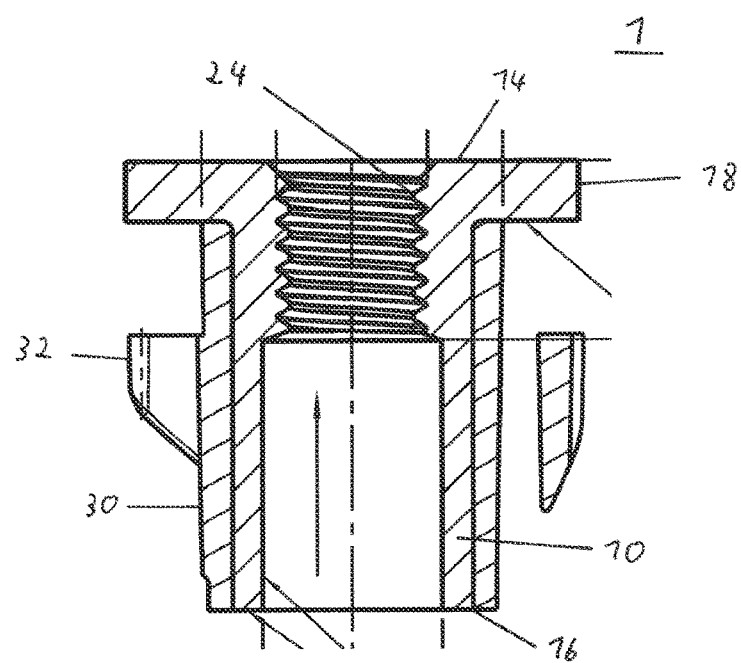

In this regard, and with respect to FIG. 6, the hollow element 30 may have an axial length corresponding to the length of the hollow shaft 10 from the bottom side of the collar 18 to the second axial end 16. Thus, the hollow element 30 extends from the bottom side 22 of the collar 18 to the second axial end 16 of the hollow shaft 10 and is arranged flush with this second axial end 16.

In use, it is important that the hollow element 30 is mounted on the hollow shaft 10 in a rotation proof manner. For achieving this, the hollow element 30 may be fastened on the hollow shaft 10 by a press-fit, adhesion, shrinking or both parts 3 and 5 may be made by a two-component plastic injection molding method. This latter possibility allows the adaption of the first part 3 to the required stability and of the second part 5 to the desired flexibility. The other methods allow that the first part 3 may be made of metal so that a metal-to-metal connection can be realized between connecting element 1 and connecting screw 50.

The spring arms 32 are flexible in the radial direction. To this end, a first end of the spring arms 32 is fastened at the connecting element 1 and a second end is a free end. The free end, thus, may have the largest distance to the hollow shaft 10 of the connecting element 1. A side of the spring arm 32 facing the collar 18 is identified with reference sign 34 and a side of the spring arm 32 facing away from the collar 18 is identified with reference sign 36.

The side 34 of the spring arms 32 facing the collar 18 are arranged in a plane parallel to a plane defined by the bottom side 22 of the collar 18. By means of this arrangement, a tolerance gap 38 for receiving an intermediate support 44 of a first component is formed between the bottom side 22 of the collar 18 facing the spring arms 32 and the sides 34 of the spring arms 32 facing the collar 18. Due to the two parallel planes, an even abutment at an intermediate support 44 at the first component 40 may be achieved, as will become clear later.

In the present example, the spring arms 32 extend, beginning at the fastened first end, radially outwardly in counterclockwise direction. It is also possible to arrange the spring arms 32 in clockwise direction. All spring arms 32, i.e. here all three spring arms 32, may be arranged in the same direction, i.e. clockwise or counterclockwise.

Further, the sides 36 of the flexible spring arms 32 facing away from the collar 18 are chamfered. The chamfering may be present in both the axial and radial direction of the hollow shaft 10. By means of this design, an insertion of the connecting element 1 into the first component 40 may be facilitated as the force required for insertion is reduced. Also, by means of the chamfering the risk of scratches at the first component 40 is reduced. These chamfering may be seen in FIG. 4.

For increasing the understanding of the function of the connecting element 1, the use of the connecting element 1 will be explained in the following with respect to FIGS. 7 to 17.

Figure 7:
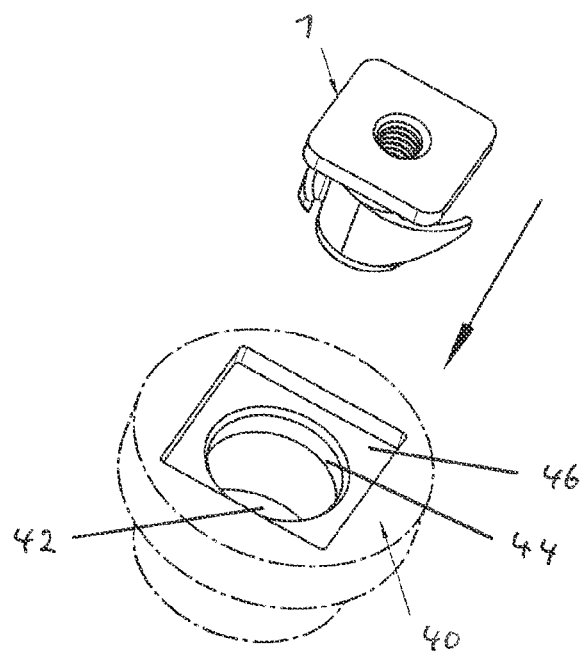

In FIG. 7, the connecting element 1 and the first component 40 are provided. The first component 40 has a threadless through-hole 42 in which a radially inwardly circumferentially all round extending intermediate support 44 is present. Furthermore, the first component 40 has a recess 46 formed in a top side of the first component 40 adjacent to the intermediate support 44. The recess 46 has a shape adapted to the shape of the collar 18 and a depth such that the top side 20 of the collar 18 is arranged flush with or recessed to the top side of the first component 40 in case the sides 34 of the spring arms 32 facing the collar 18 abut at the intermediate support 44.

Figure 8:
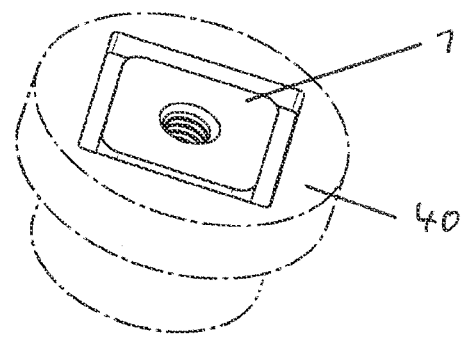
Figure 9:
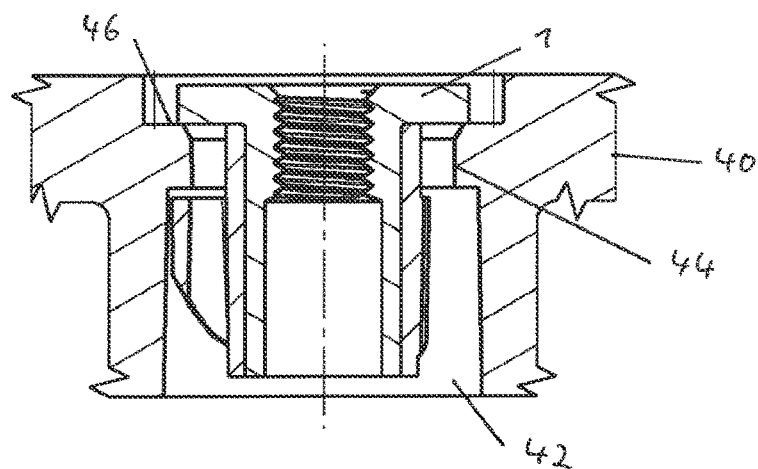

FIGS. 8 and 9 show the first component 40 having the connecting element 1 inserted therein. As the connecting element 1 is inserted from the top side into the through-hole 42 of the first component 40, first the spring of arms 32 must pass the intermediate support 44. As a result, the spring arms 32 flex radially inwardly during the insertion and, as soon as they have passed the intermediate support 44, they flex radially outwardly. Accordingly, the connecting element 1 can be clipped into the through-hole 42 of the first component 40.

As the collar 18 has a dimension such that it cannot pass through the intermediate support 44, the intermediate support 44 of the first component 40 is received in the tolerance gap 38 formed between the bottom side 22 of the collar 18 and the side 34 of the spring arms 32 facing the collar 18. A resulting axial movability of the connecting element 1 in this state may correspond to the height of one thread pitch of the inner thread 24 in the hollow shaft 10 of the connecting element 1. By means of this, a possible thread offset to an inner thread 62 of a second component 60 can be compensated, if necessary.

Further, a diameter or dimension of the through-hole 42 of the first component 40 and the spring arms 32 is chosen such that the spring arms 32 abut at the inner wall of the through-hole 42 of the first component 40. By means of this dimensioning, the spring arms 32 realize a centralizing function for the connecting element 1 in the through-hole 42 of the first component 40. Accordingly, a central longitudinal axis of the hollow shaft 10 of the connecting element 1 and of the through-hole 42 of the first component 40 are identical in this state.

Figure 10:
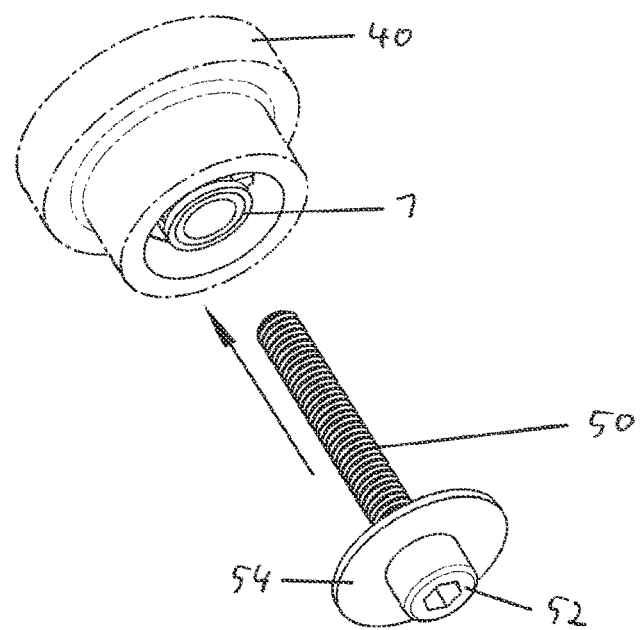
Figure 11:
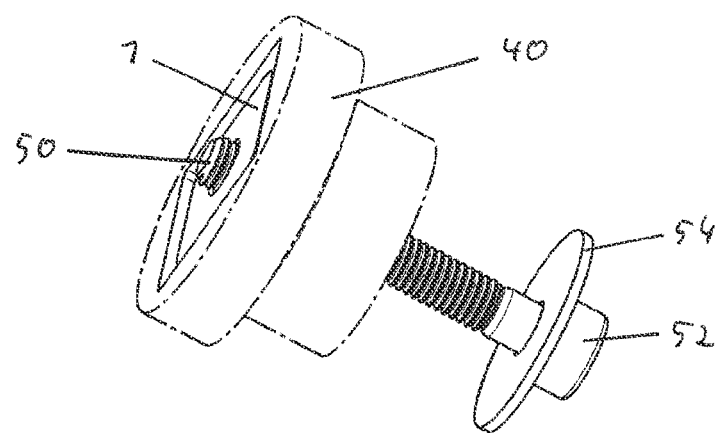
Figure 12:
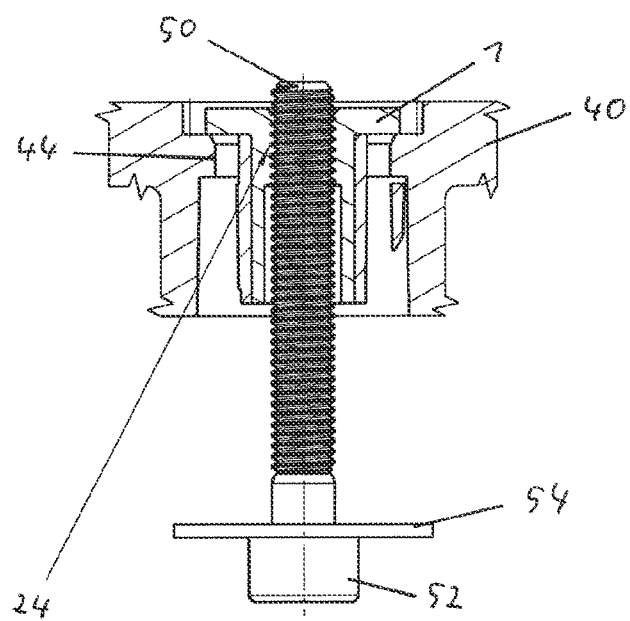

In a next step and as shown in FIGS. 10 to 12, the connecting screw 50 is inserted into the first component 40 and the connecting element 1 fastened therein. The connecting screw 50 has a head 52 and a washer 54 adjacent to the head 52. Further, the connecting screw 50 has a single thread.

The connecting screw 50 is inserted into the first component 40 from a bottom side, i.e. from a direction opposite to the insertion direction of the connecting element 1 into the through-hole 42 of the first component 40. In a first step, the connecting screw 50 is thus screwed into the inner thread 24 in the hollow shaft 10 of the connecting element 1. Depending on the application field, a transportation security may be provided by a seal coating on the connecting screw 50 or a specific shape of the last thread of the inner thread 24 in the hollow shaft 10 in case the hollow shaft 10 is made of plastic material.

As can be seen in these examples, the axial movability of the connecting element 1 is present in each case.

Figure 13:
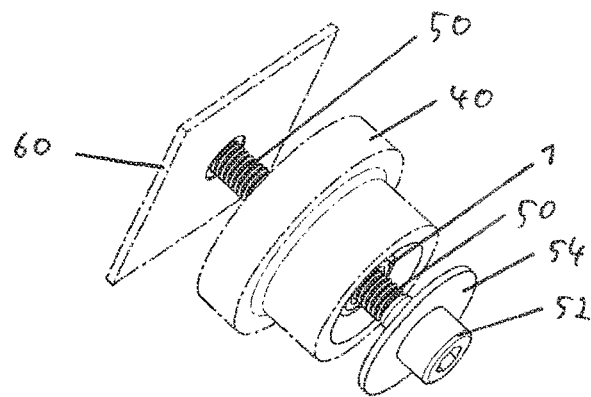
Figure 14:
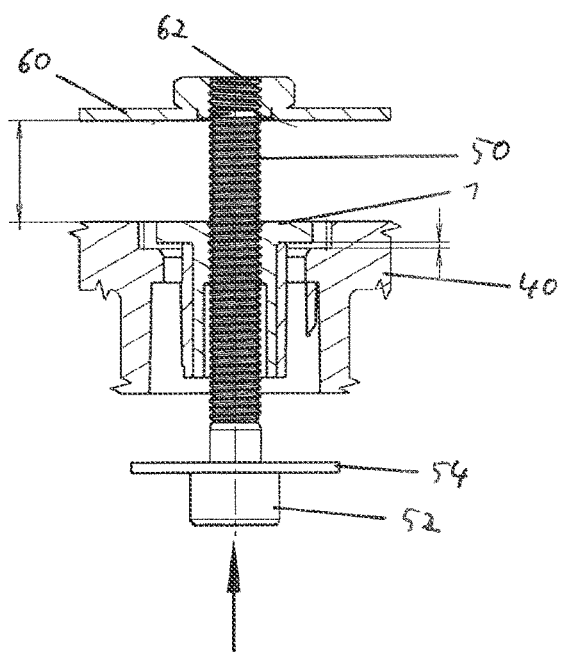

Now, and as shown in FIGS. 13 and 14, the second component 60 is provided. This second component 60 has an opening and an inner thread 62 is provided adjacent to the second component 60 for engagement with the connecting screw 50. Thus, the inner thread 24 in the hollow shaft 10 and the inner thread 62 adjacent to the second component 60 may have the same size and thread direction.

In the example shown, the inner thread 62 at the second component 60 is aligned with the first component 40 such that the central longitudinal axis of the hollow shaft 10 of the connecting element 1 extends centrally through the opening in the second component 60 and, thus, the inner thread 62 at the second component 60. As a result, no lateral or radial tolerance compensation is required. The functioning of the radial or lateral tolerance compensation will, nevertheless, be explained later with respect to FIGS. 18 to 22.

Figure 15:
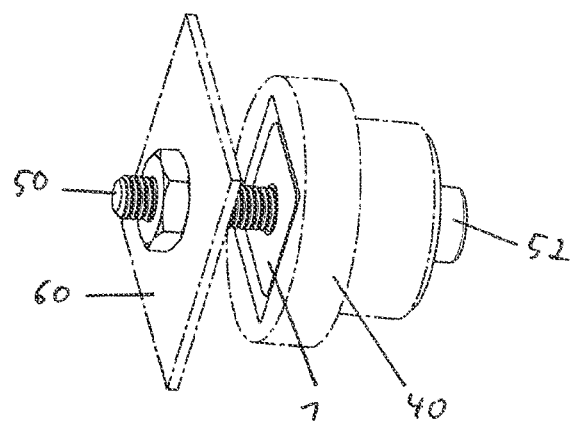
Figure 16:
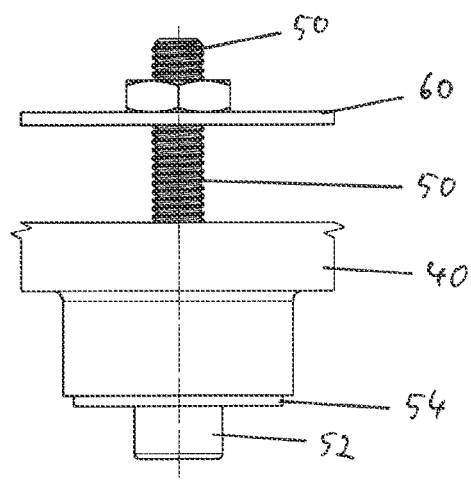
Figure 17:
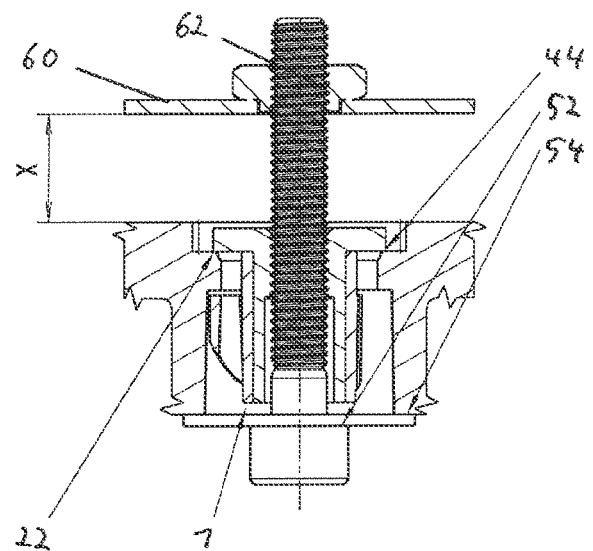
Figure 18:
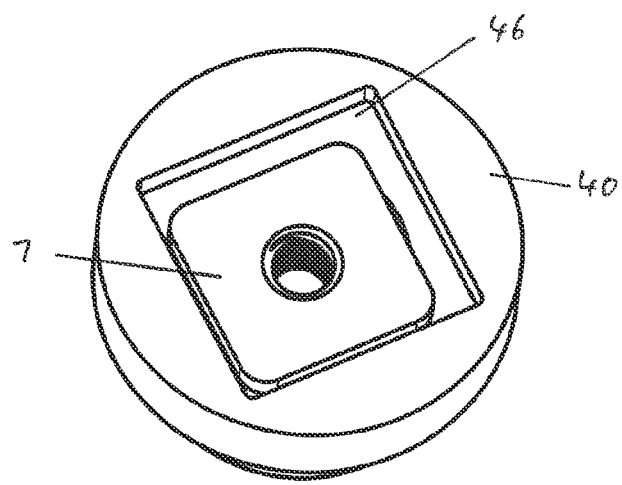
Figure 19:
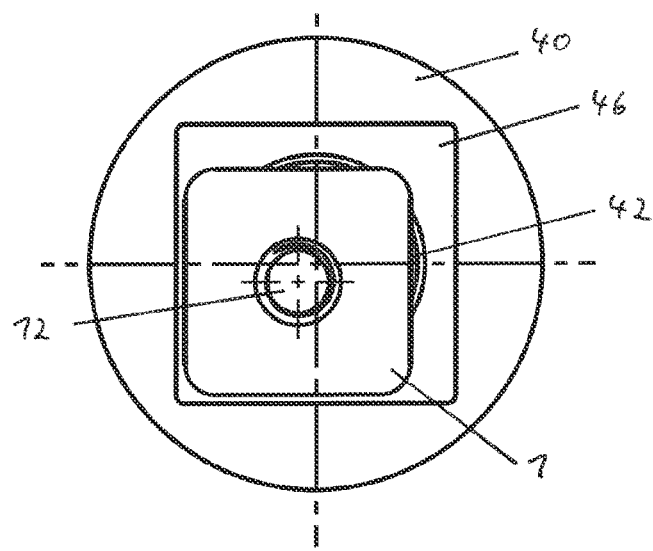
Figure 20:
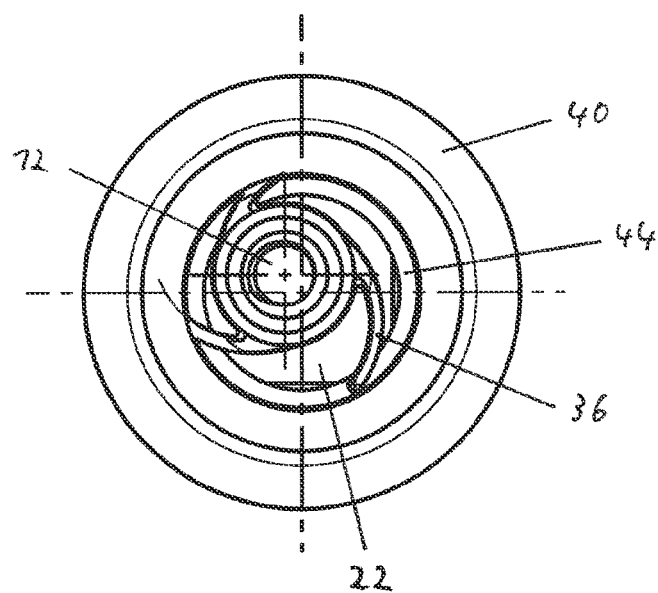
Figure 21:
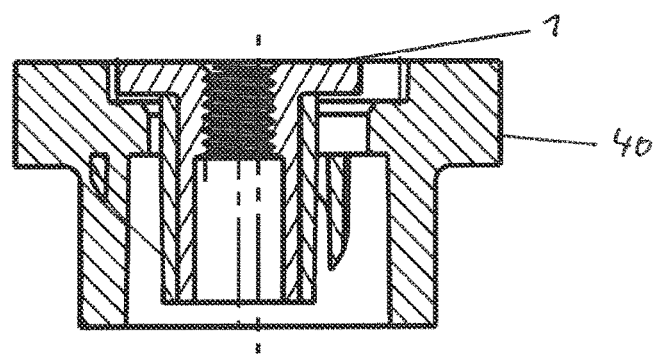
Figure 22:
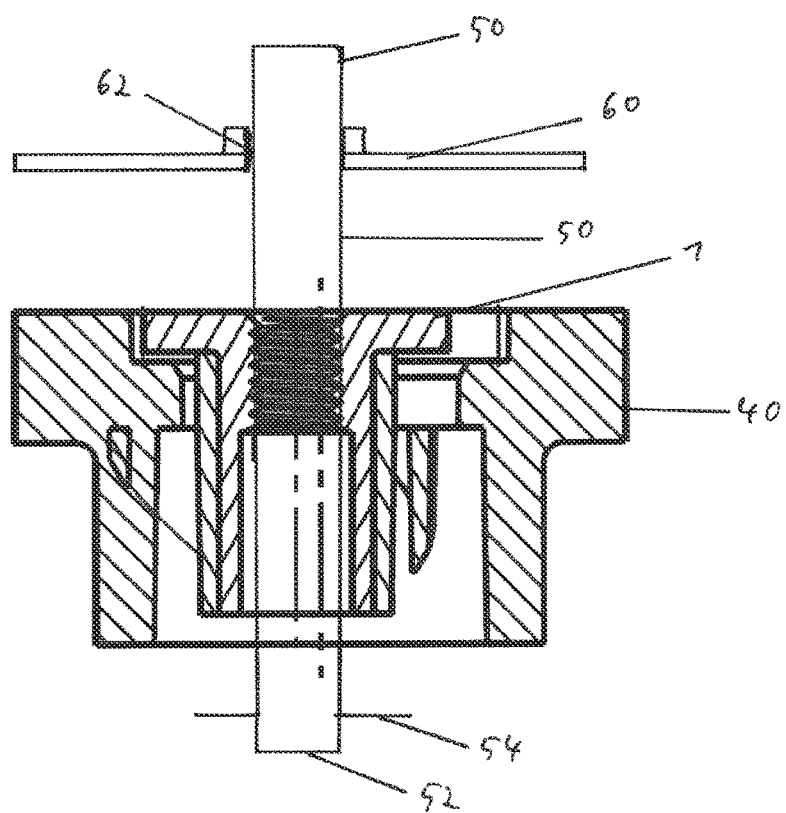

Now, the connecting screw 50 is screwed further into the inner thread 24 in the hollow shaft 10 so that it comes into engagement with the inner thread 62 at the second component 60. The connecting screw 50 is rotated until the washer 54 or head 52 abuts at the first component 40 or is supported by the first component 40. This state is shown in FIGS. 15 to 17. Here, additionally, the connecting element 1 has been moved relative to the first component 40 and the bottom side 22 of the collar 18 abuts the intermediate support 44 so that a further screwing-in is blocked.

With respect to FIGS. 18 to 22, the lateral or radial tolerance compensation is explained next. In these examples, the central longitudinal axis of the hollow shaft 10 of the connecting element 1 is offset with respect to the central longitudinal axis of the through-hole 42 of the first component 40 for bringing the central longitudinal axis of the hollow shaft 10 into alignment with the central longitudinal axis of the opening of the second component 60 (see FIG. 22). Such a radial tolerance compensation is usually performed after the connecting screw 50 has been screwed into the inner thread 24 in the hollow shaft 10 and upon engagement of the connecting screw 50 with the inner thread 62 at the second component 60.

For the sake of completeness, it is pointed out that the lateral or radial movability of the connecting element 1 in the through-hole 42 of the first component 40 is limited by the inner dimensions or diameter of the intermediate support 44 in relation to the outer dimensions or diameter of the connecting element 1 in the portion of the tolerance gap 38 and/or by the inner dimensions or diameter of the through-hole 42 of the first component 40 in relation to the outer dimensions or diameter of the connecting element 1 in the region of the spring arms 32 in case of laterally compressed spring arms 32.

Figure 23:
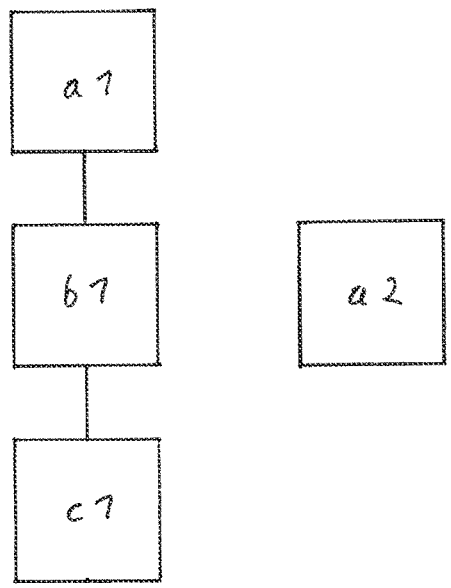

With respect to FIG. 23, a schematic course of procedure of an embodiment of a production method for the connecting element 1 is described. In a first step a1, a providing of a first part 3, may be made of metal, comprising the hollow shaft 10 with the collar 18 and the inner thread 24 takes place. Subsequently, at the same time or before the first step a1, a second step b1 is performed in which a second part 5, which may be made of plastic, is provided. The second part 5 consists of a hollow element 30 having a plurality of laterally, which may be radially, outwardly extending flexible webs, in the present case spring arms 32. Next, a fastening of the second part 5 on the first part 3 takes place in step c1 by at least one of a press-fit, adhesion, shrinkage or injection molding the second part 5 on the first part 3. By means of these method steps, the connecting element 1 is produced.

In an alternative, and for further reducing the production effort, an injection molding of the connecting element 1 may take place in a single alternative first step a2. Here, the connecting element 1 is provided as a single element by means of an injection mold having complementary form features.

Figure 24:
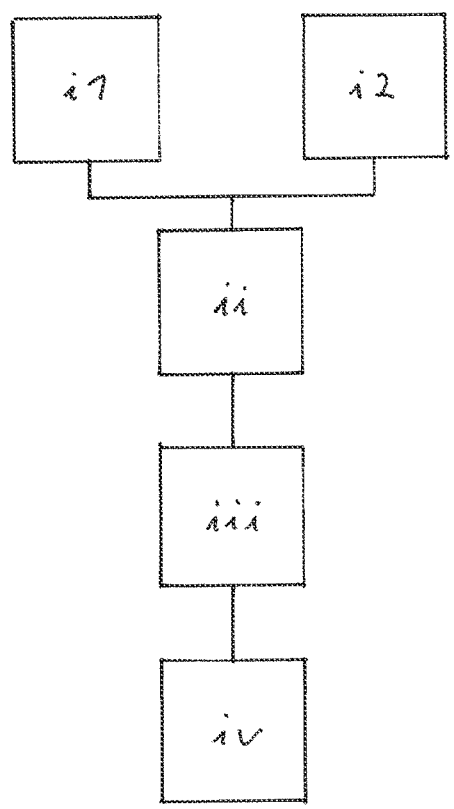

Finally, and with respect to FIG. 24, a schematic course of procedure of an embodiment of a connecting method using the connecting element 1 is explained. At the beginning, a first component 40 with inserted connecting element 1 is provided in step i1. Alternatively, a first component 40 having a through-hole 42 is provided and the connecting element 1 is inserted into the through-hole 42 of the first component 40 in the alternative first step i2. In each case, a first component 40 having the connecting element 1 inserted therein is present at the end of the first step.

Next, a second component 60 having an opening is arranged in step ii in alignment with the first component 40, which may be in a distance to the first component 40, such that a top side 20 of the collar 18 opposite to the bottom side 22 faces the second component 60.

Now, and in step iii, a connecting screw 50 is inserted into the first component 40 and the connecting screw 50 is screwed into the inner thread 24 provided by the hollow shaft 10 of the connecting element 1 and, subsequently, into the inner thread 62 provided at or adjacent to the second component 60 until a screw head 52 abuts or is supported by the first component 40 and a further screwing-in is blocked by the collar 18 abutting at the intermediate support 44.

In case the opening of the second component 60 is not in alignment with the central longitudinal axis of the hollow shaft 10, the hollow shaft 10 is moved in the through-hole 42 of the first component 40 such that the longitudinal axis of the hollow shaft 10 is brought into alignment with the inner thread 62 of the second component 60. Such a lateral or radial tolerance compensation is performed by the flexible webs, i.e. the spring arms 32, in step iv. Otherwise, the spring arms 32 realize in step iv a centering of the connecting element 1 in the through-hole 42 of the first component 40.

The invention claimed is:

1. A generally T-shaped connecting element adapted to connect a first component to a second component with lateral tolerance compensation, which are arranged in a distance with respect to each other, the connecting element comprising:
   a) a hollow shaft having a through-hole, a laterally outwardly extending collar at a first axial end of the hollow shaft and an inner thread in the hollow shaft for engagement with a connecting screw,
   b) a plurality of flexible webs extending laterally outwardly from the hollow shaft, and being flexible in the lateral direction, and
   c) a tolerance gap for receiving an intermediate support of the first component is formed between a bottom side of the collar facing the flexible webs and the sides of the flexible webs facing the collar, wherein
   d) the connecting element is a two-part element, a first part of which consists of the hollow shaft comprising the collar and a second part of which consists of a hollow element at which the laterally outwardly extending flexible webs are provided.

2. The connecting element according to claim 1, wherein the collar has a shape providing a rotation protection.

3. The connecting element according to claim 1, wherein
   a) the sides of the flexible webs facing the collar are arranged in a plane parallel to a plane defined by the bottom side of the collar and/or
   b) the sides of the flexible webs facing away from the collar are chamfered.

4. The connecting element according to claim 1, wherein the flexible webs are formed by laterally outwardly extending spring arms, a first end of which is fastened at the connecting element and a second end of which is a free end.

5. The connecting element according to claim 1, wherein the first part and the second part are connected to each other in a rotation proof manner.

6. A first component having a through-hole in which a connecting element is arranged, the connecting element being a generally T-shaped connecting element adapted to connect a first component to a second component with lateral tolerance compensation, which are arranged in a distance with respect to each other, and comprising: a hollow shaft having a through-hole, a laterally outwardly extending collar at a first axial end of the hollow shaft and an inner thread in the hollow shaft for engagement with a connecting screw, a plurality of flexible webs extending laterally outwardly from the hollow shaft, and being flexible in the lateral direction, and a tolerance gap for receiving an intermediate support of the first component is formed between a bottom side of the collar facing the flexible webs and the sides of the flexible webs facing the collar, wherein
   a) an intermediate support of the first component extends laterally, inwardly in the through-hole of the first component and
   b) the intermediate support is arranged in the tolerance gap of the connecting element such that an axial movability of the generally T-shaped connecting element is limited by the collar and the flexible webs,
   c) a rotation protection is formed between the collar and the first component, and
   d) the flexible webs are arranged within the through-hole of the first component thereby realizing a tolerance compensation in the lateral direction.

7. The first component according to claim 6, further having a recess adjacent to the intermediate support in which the collar is at least partly arranged.

8. The first component according to claim 6, wherein a diameter of the through-hole of the first component is smaller than an outer diameter of the flexible webs of the connecting element.

9. A connection structure consisting of the first component according to claim 6, a second component and a connecting screw, wherein
   a) the connecting screw extending through the first component is engaged with the inner thread in the hollow shaft of the connecting element and with an inner thread at the second component, and
   b) a head of the connecting screw is supported by the first component.

10. The connection structure according to claim 9, wherein the first and the second component are arranged in a distance to each other.

11. The connection structure according to claim 9, wherein the inner thread in the hollow shaft and the inner thread at the second component have the same size and thread direction.

* * * * *